Sept. 19, 1933.    A. O. JAEGER ET AL    1,927,286
CATALYTIC APPARATUS
Filed April 9, 1926    7 Sheets-Sheet 1
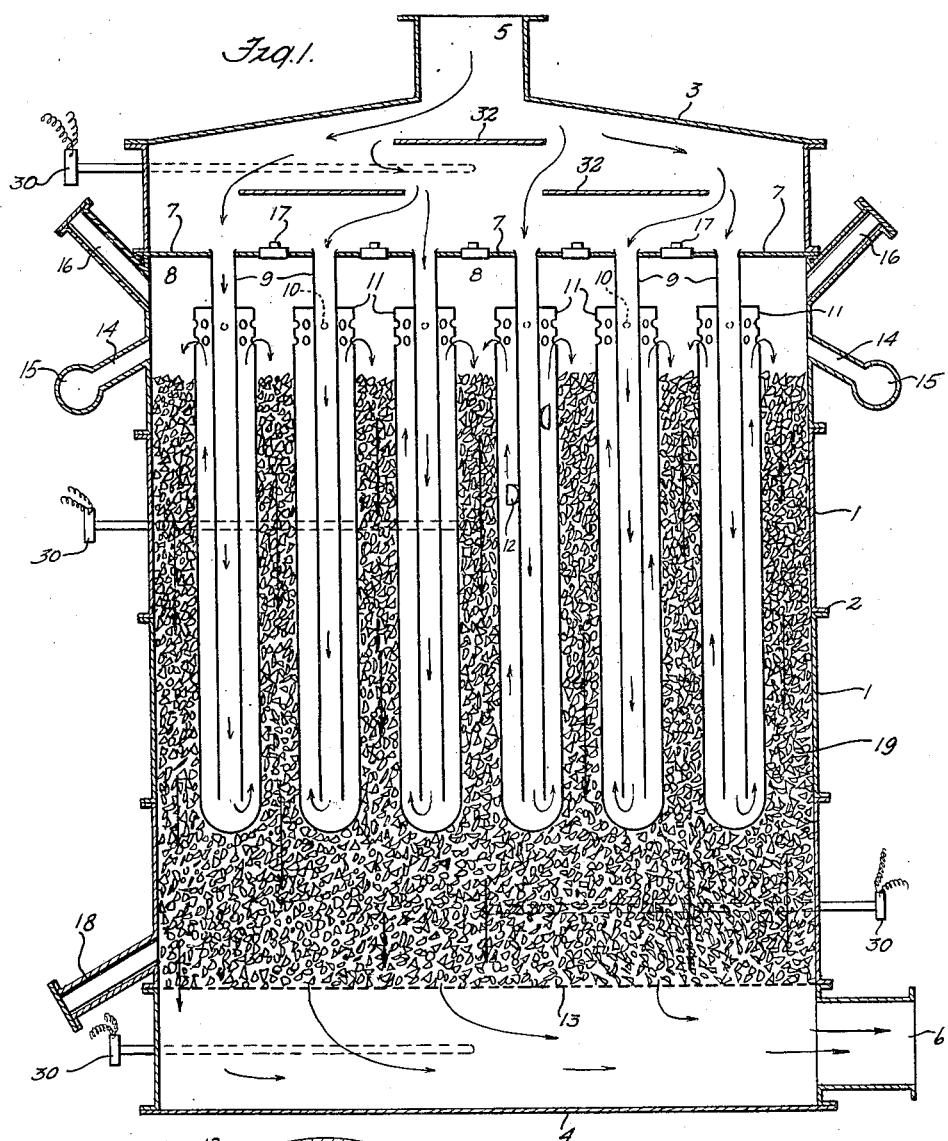
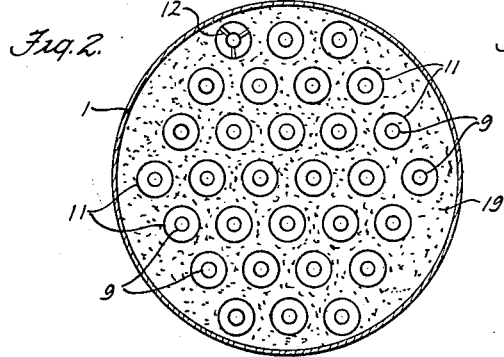
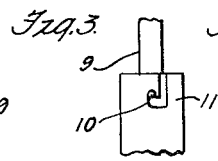
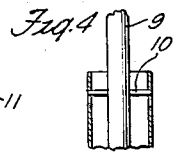
INVENTORS
ALPHONS O. JAEGER
JOHANN A. BERTSCH
BY Newell & Spencer
ATTORNEYS

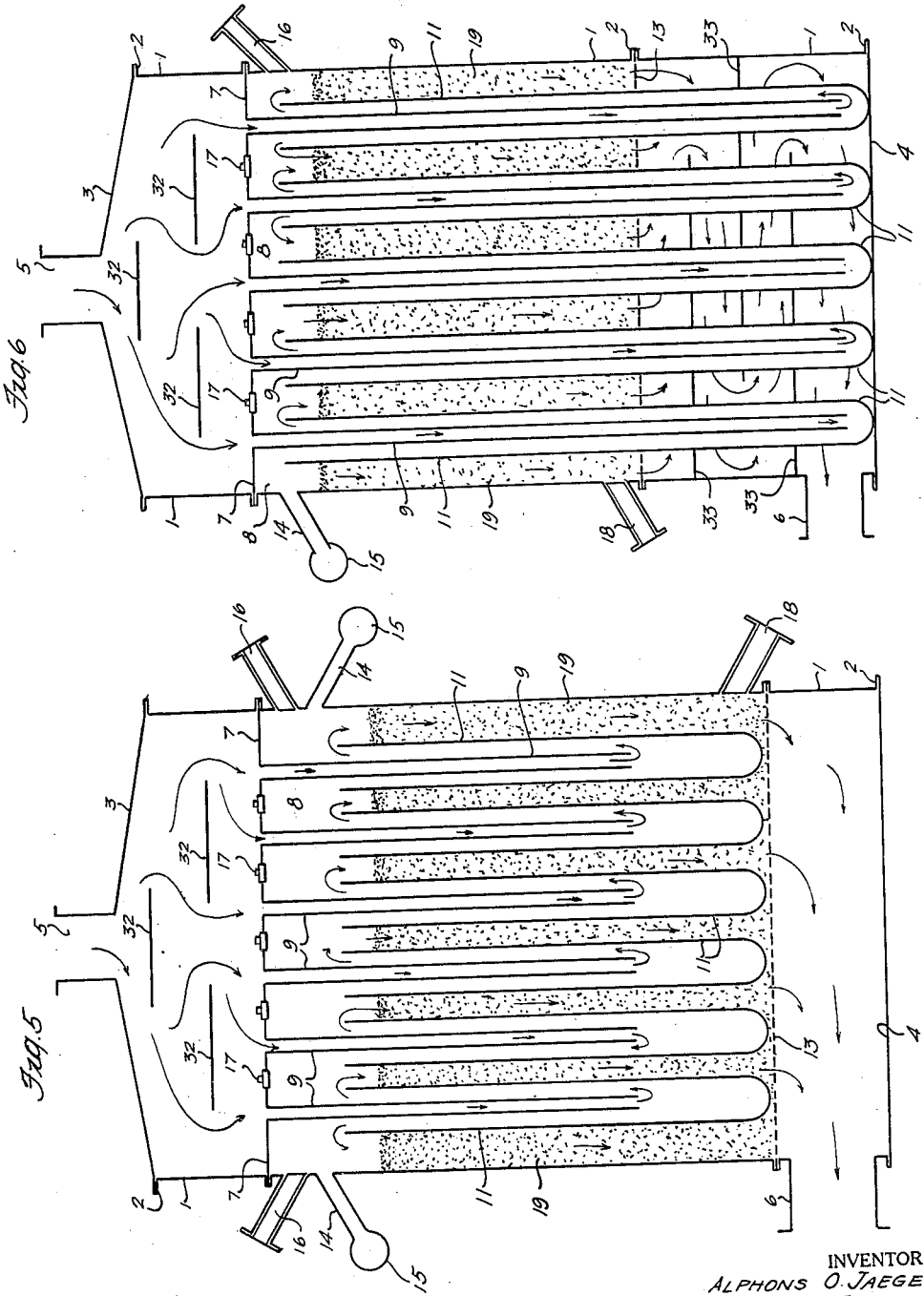

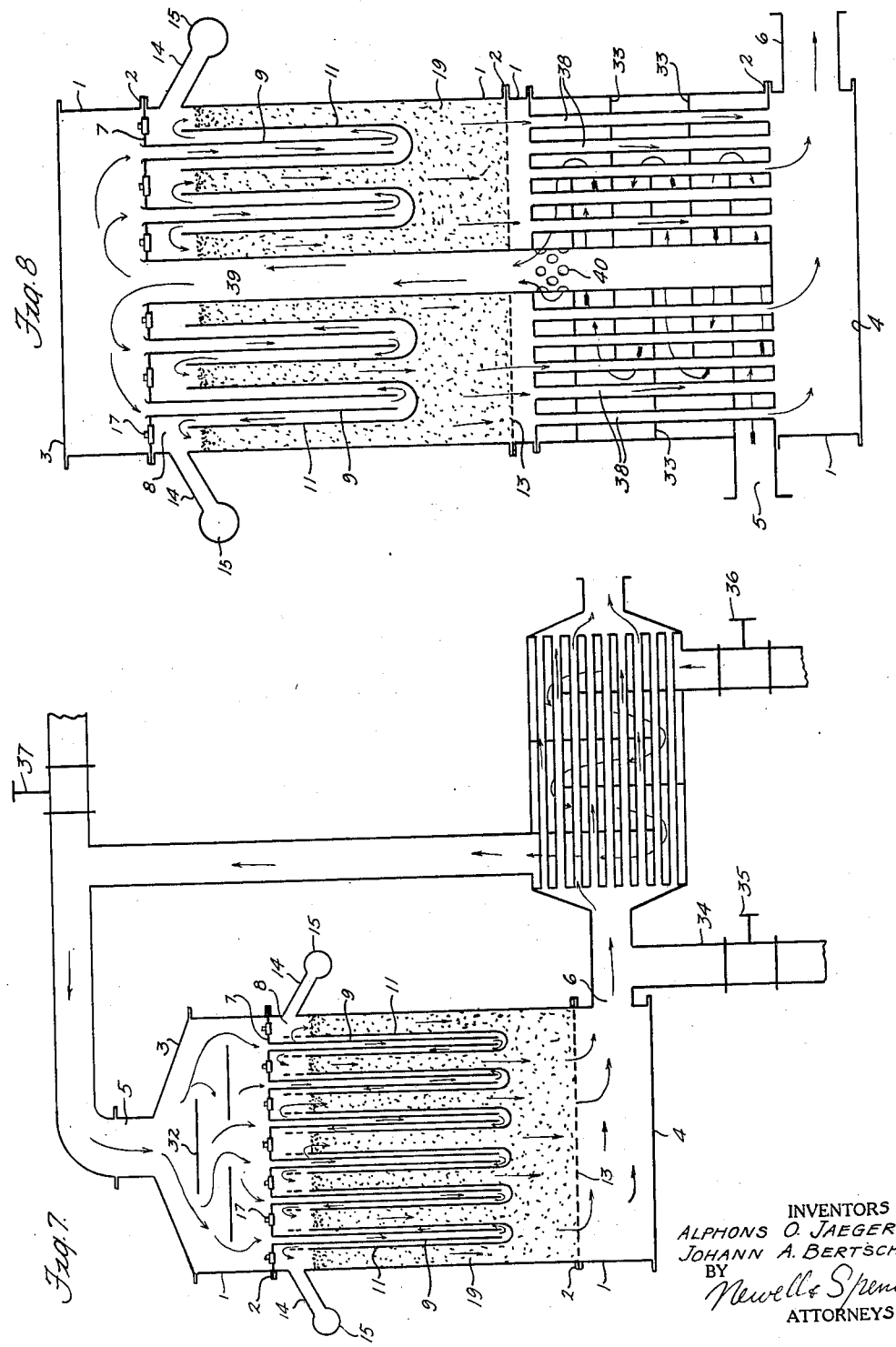

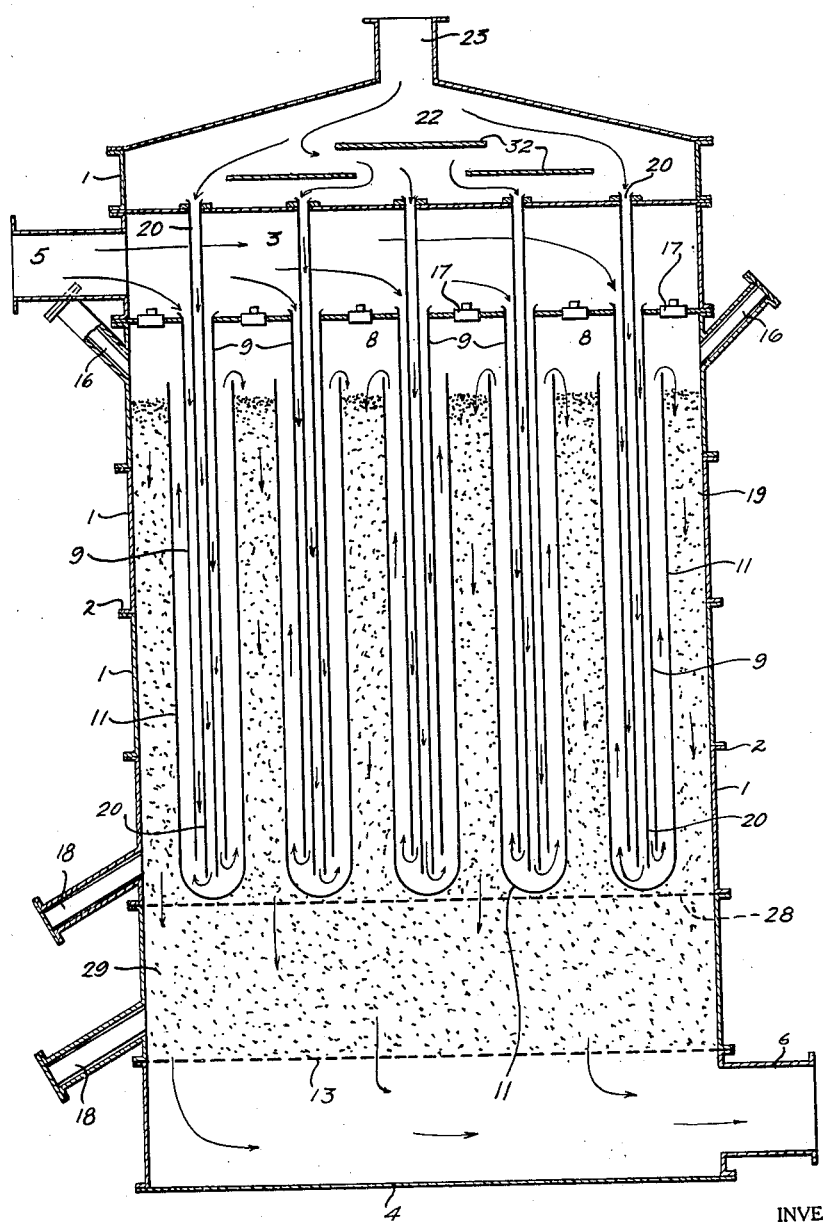

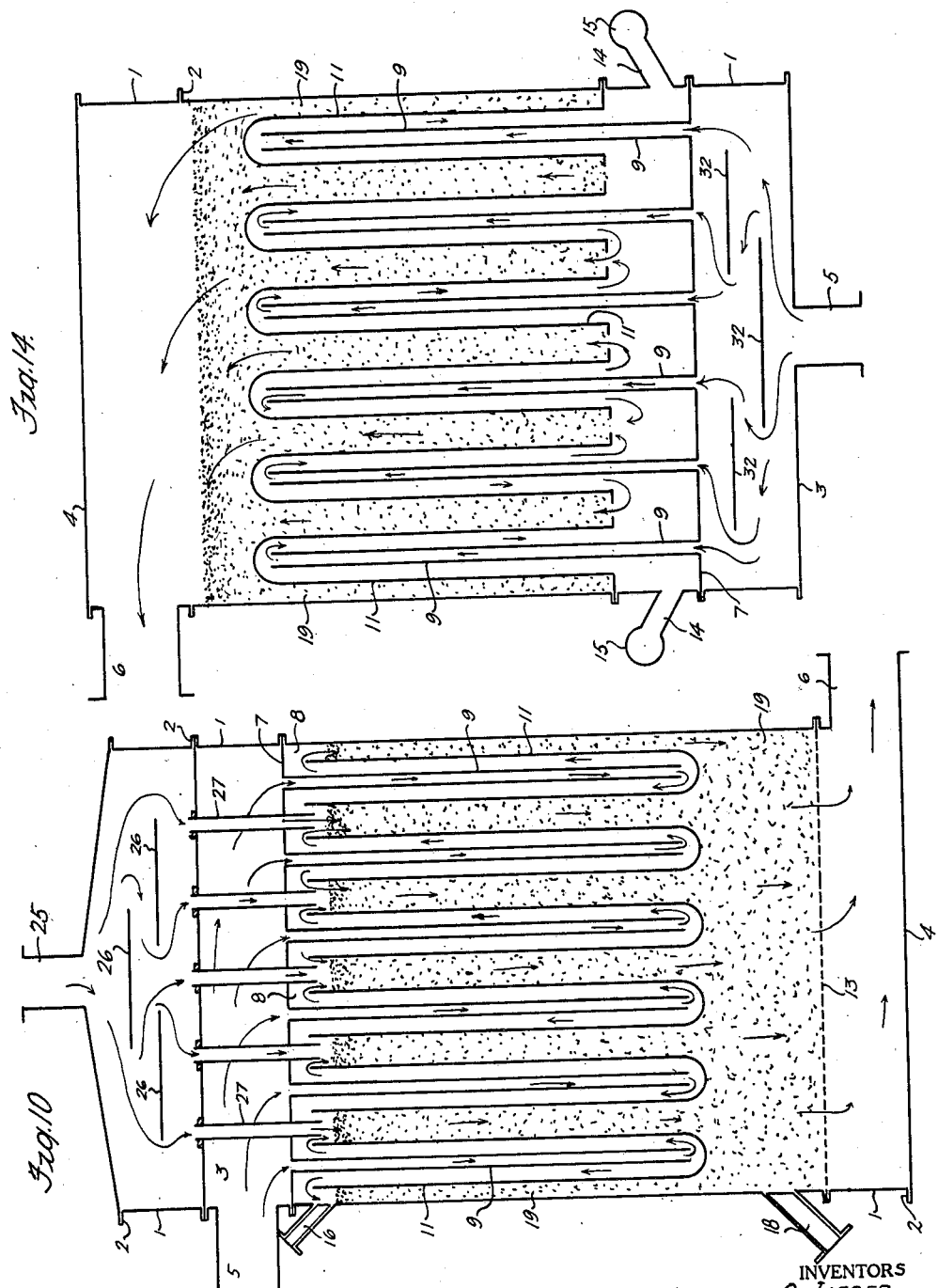

Sept. 19, 1933. A. O. JAEGER ET AL 1,927,286
CATALYTIC APPARATUS
Filed April 9, 1926 7 Sheets-Sheet 6
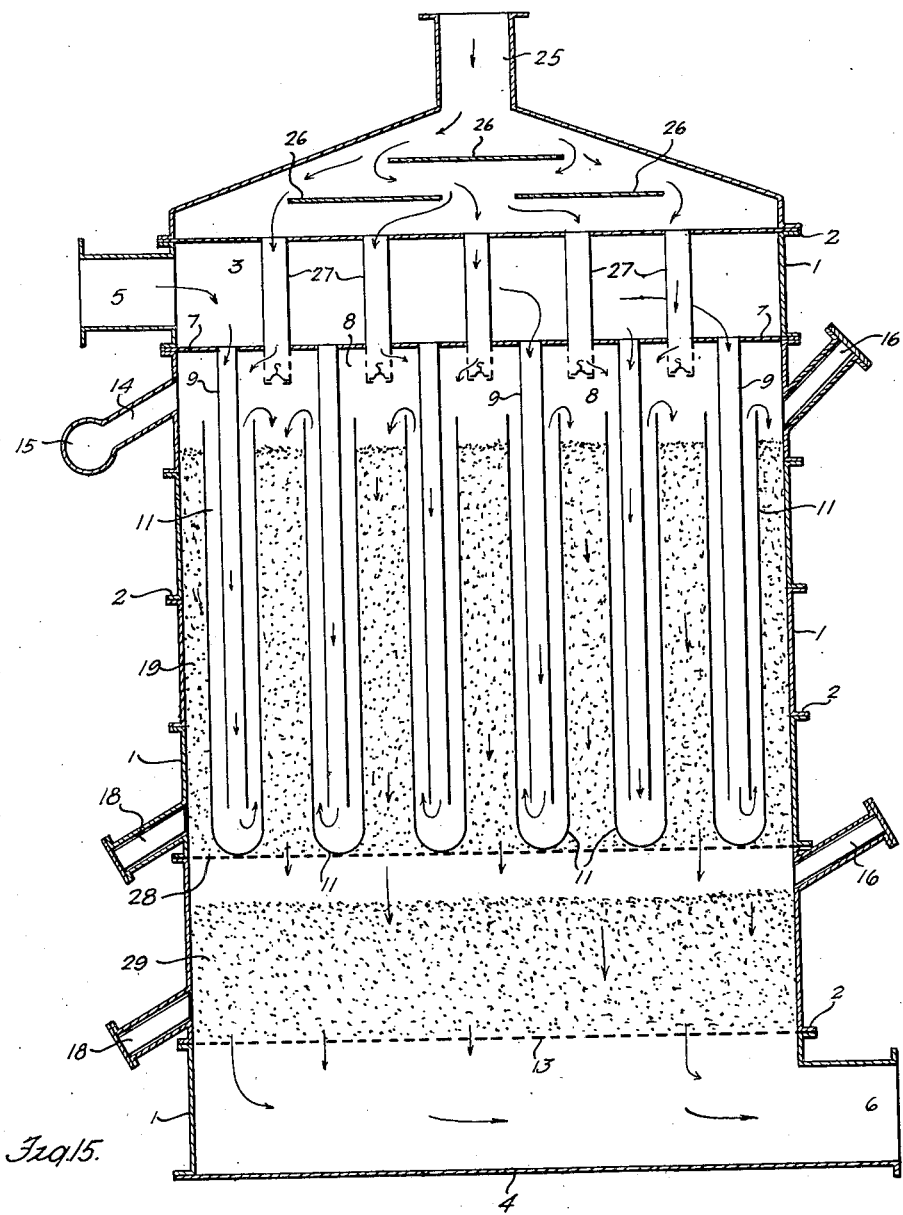
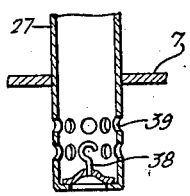
INVENTORS
ALPHONS O. JAEGER
JOHANN A. BERTSCH
BY
Newell & Spencer
ATTORNEYS Sept. 19, 1933.  A. O. JAEGER ET AL  1,927,286
CATALYTIC APPARATUS
Filed April 9, 1926  7 Sheets-Sheet 7
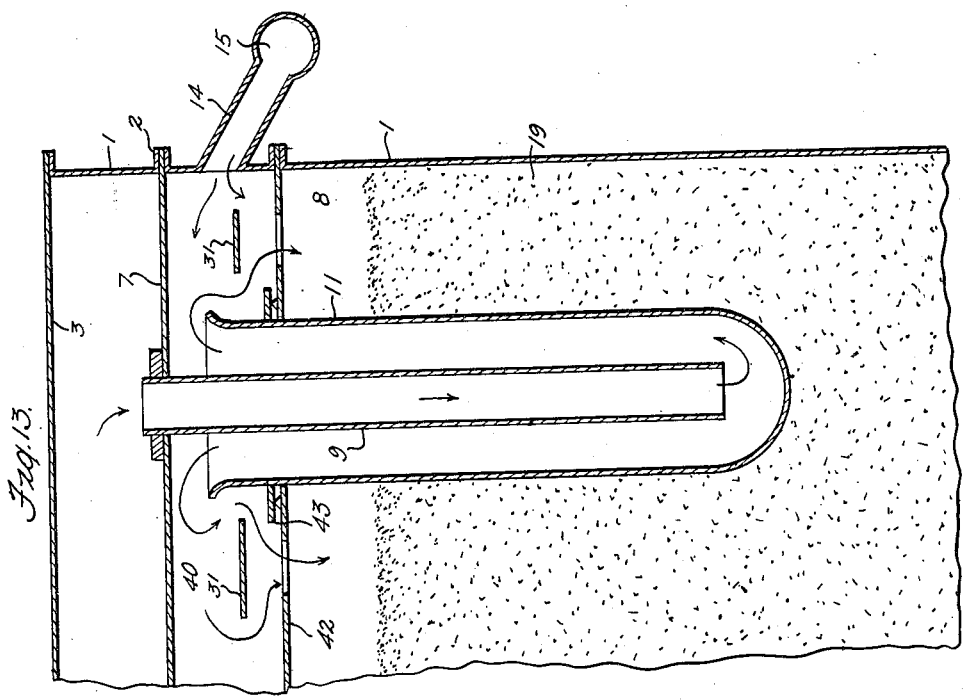
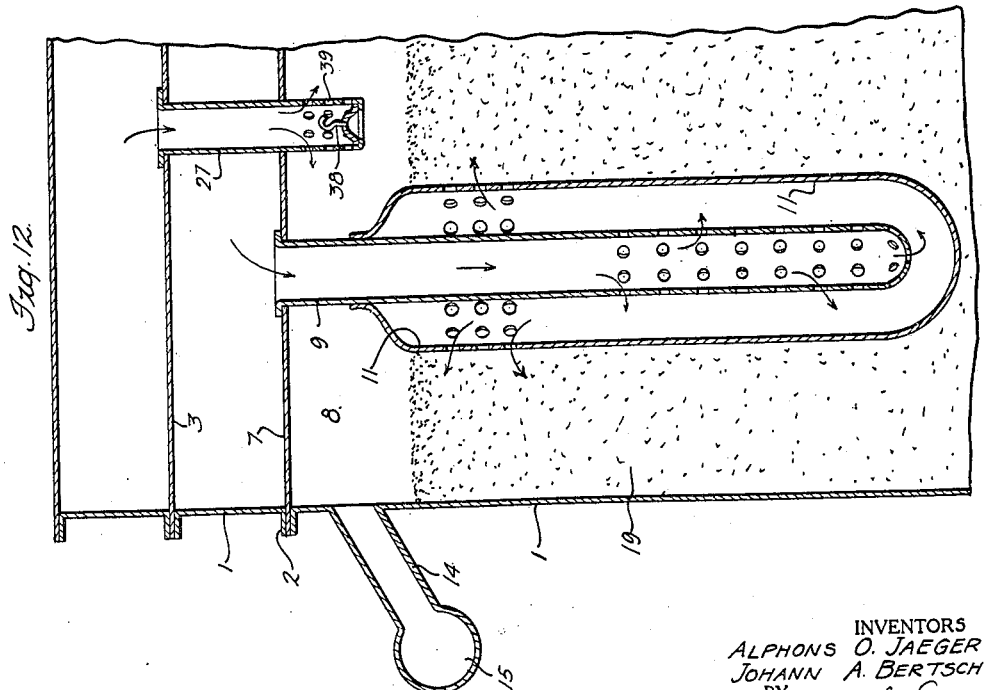
INVENTORS
ALPHONS O. JAEGER
JOHANN A. BERTSCH
BY
Newell & Spencer
ATTORNEYS Patented Sept. 19, 1933

1,927,286

UNITED STATES PATENT OFFICE 1,927,286

CATALYTIC APPARATUS

Alphons O. Jaeger and Johann A. Bertsch, St. Louis, Mo.; said Jaeger assignor to The Selden Company, Pittsburgh, Pa., a corporation of Delaware Application April 9, 1926. Serial No. 100,818

8 Claims. (Cl. 23—288)

This invention relates to catalytic apparatus and methods particularly to converters and similar apparatus for vapor phase catalyses.

Many catalytic reactions, particularly certain vapor phase catalytic reactions, such as the oxidation of sulfur dioxide, certain organic oxidations, and reductions, as for example, the reduction of nitro compounds to amines, are strongly exothermic and require efficient cooling means to control the reaction. At the same time, it is necessary to maintain a sufficient temperature in all parts of the catalytic zone in order to keep the reaction going. Many elaborate schemes have been tried in the apparatus in order to control catalytic reactions of the type referred to, but for the most part, these attempts have been either unsuccessful or have presented many disadvantages.

It is the object of the present invention to obviate many of the disadvantages of previous converters and other catalytic apparatus and to control exothermic catalytic reactions in a simple and effective manner with an apparatus which is neither complicated, delicate nor unduly expensive.

With these and other objects in view, the present invention utilizes cool or cold reaction gases to effect a large portion of the cooling of the converter and more particularly of its catalytic charge. At the same time, the cold gases are heated up to a suitable reaction temperature. This object is effected by causing a circulation of cold or relatively cool gases in counterflow to the flow of gases through the contact mass and in heat exchanging relation therewith. In the preferred modification, the cool gases or a portion of them are also circulated first in the direction of the gases in the contact mass, and in heat exchanging relation to the partly warmed gases which are circulating counter to the flow in the contact mass and in heat exchanging relation thereto. Thus, the incoming cold gases first come in heat exchanging relation with the partly warmed gases and then finally into heat exchanging relation with the contact mass in the converter where they are still further warmed up, the warming, however, being tempered by the cooling effect of the fresh incoming gases.

In many embodiments, it is desirable to heat up a portion of the gases only and in such case, a portion may be circulated in heat exchanging relation with the contact mass and counter to the flow of gases therethrough, whereas further portions of cool gases may be directly introduced into the converter at any suitable or desirable heat zones. Several gases may be circulated first in the direction of gas flow through the contact mass and then counter thereto and may be caused to mix at any desired or suitable spot or zone. The length of the counter flow in heat exchanging relation with the contact mass may also be varied, either for the incoming gases as a whole or for portions of the incoming gases. The counterflow circulation of the present invention may also be combined with separate heat exchangers for cooling or heating gases and these heat exchangers may be integral with the converter structure, external thereto, or both. Various combinations of different catalytic zones and different rates of cooling may also be used and some of these possible modifications will be illustrated in the drawings.

The counterflow or alternate direct and counterflow of gases which form the main features of the converters of the present invention may be applied to a large number of varying types of converters and the illustrations in the drawings show only a few converters of common types and the invention is in no sense limited to the particular converter shown nor to the particular combination of features which are associated with any one converter.

The present invention is, of course, particularly advantageous in reactions which are strongly exothermic or which require very delicate temperature control. The invention, however, is not limited to converters to be used in such reactions and the features and advantages of the present invention may be used in connection with any vapor phase catalytic reactions whether requiring delicate control or not and where in the specification, advantages are described in terms of their effects in particular reactions where the features of the present invention are especially important, it should be understood that these advantages are applicable to other types of converters and to other reactions.

The simple and effective temperature control by means of reaction gases in accordance with the present invention not only increases the efficiency of catalytic reactions in terms of yields by decreasing side reactions, but at the same time, it is possible by utilizing the features of the present invention to prevent local overheating of the catalysts used and thus to greatly prolong the useful life of the catalysts.

The invention is also applicable in reactions which are carried on at pressures above or below that of the atmosphere.

The present invention should not be considered solely as a means for controlling reactions which would otherwise tend to become too violent. This feature is an important one and in many reactions is the most important, but the present invention also opens up a large field of catalytic reactions to simplified and more economical processes. While it is possible to utilize the advantages of the present invention in connection with elaborate cooling means for catalytic apparatus and such systems are included in the scope of the present invention, it is one of the outstanding advantages of the present improved process and apparatus that in many cases elaborate cooling apparatus can be dispensed with partly or wholly and at the same time a very economical use of heat generated in the catalytic reaction can be availed of, thus saving in the case of reactions which are not strongly exothermic, considerable amounts of fuel which would otherwise be required to start the reaction.

Other and further advantages of the present invention will appear from the following detailed description of a number of converters incorporating one or more of the novel features of the present invention and which are illustrated diagrammatically in the accompanying drawings, in which—

Fig. 1 is a vertical cross-section through a converter employing cooling tubes of the present invention;

Fig. 2 is a horizontal cross-section through the same converter;

Figs. 3 and 4 are details of one type of fastening for the converter tubes;

Fig. 5 is a vertical cross-section through a converter showing a modified type of cooling tubes;

Fig. 6 is a vertical section through a converter showing cooling tubes in contact with exhaust gases as well as catalyst;

Fig. 7 is a vertical section through a converter and external heat exchanger;

Fig. 8 is a cross-section through a converter and internal heat exchanger;

Fig. 9 is a section through a converter showing a plurality of catalyst layers and introduction of a plurality of cooling gases;

Fig. 10 is a vertical section through a modified converter of the type shown in Fig. 9;

Fig. 11 is a vertical section through a converter showing a further modification of the type of Fig. 9;

Figs. 12 and 13 are detailed vertical cross-sections of modified forms of cooling tubes;

Fig. 14 is a section through an inverted converter; and

Fig. 15 is a detail of the gas tube shown in Fig. 11.

The catalyst is shown in granular form in Fig. 1 and is conventionally indicated by stippling in the remaining figures. It should be understood that the representation of the catalyst is only a conventional representation and the invention is not in any sense limited to the use of any particular types or shape of catalyst.

The converter shown in Fig. 1 consists of an outer shell formed of rings 1 provided with flanges 2 and connected to a top piece 3 and bottom piece 4. The reaction gases enter the top piece through the pipe 5, are distributed by means of the baffles 32 and thence pass down through the central cooling tubes 9 and then up in the outer cooling tubes 11 in the opposite direction. The tubes 11 are attached to the inner tubes 9 by any suitable fastening such as a bayonet fastening illustrated in Figs. 3 and 4, the pin 10 entering into the bayonet slot in the tube 11. Other fastenings such as short chains, hooks and the like may also be employed. The inner cooling tubes 9 are, of course, firmly mounted in the top plate 7 and the alignment of tubes 9 and 11 may be preserved by spacing lugs 12.

The gases after passing up through the tubes 11 emerge through perforations at the top of the tubes into the upper gas space 8 and thence down through the catalyst 19. The catalyst is retained by the sieve or perforated bottom 13 through which the reacted gases pass into the lower space of the converter and thence out through the exhaust pipe 6.

Catalyst can be introduced either through the side openings 16 or through the openings in the plate 7 which are closed by the plugs 17. Catalyst can be removed through the outlet 18. The pipes 16 and 18 may, if desired, be filled with suitable inert material. Temperatures at various points are measured by the thermometric elements 30 which are illustrated in the form of electric pyrometers, but may, of course, be of any other suitable type. Where additional cooling gases are desired at the surface of the catalyst where the most violent reaction takes place, these gases may be introduced through the pipes 14 from the collector pipe 15.

In operation, the cold or cooled gases entering first pass down through the tubes 9 out of direct heat exchanging contact with the catalyst but in heat exchanging relation with the ascending gases in tubes 11. The gases are thus gradually warmed up and after emerging from the open end of tubes 9, they rise in tubes 11 in direct heat exchanging relation with the catalyst and in counterflow to the flow of gases through the catalyst. In the case of exothermic reactions, the catalyst is very hot and the gases in ascending the tubes 11 are rapidly and progressively heated, the rise in temperature being somewhat moderated by the cooling action of the downflowing gases in tubes 9 so that the gases emerging from the top of tubes 11 are not as at an excessively high temperature. The heated reaction gases with or without further addition of cool or cold gases through the pipes 14 then pass through the catalyst where the reaction takes place. The catalyst, however, does not become overheated as it is in intimate heat exchanging relation with the tubes and is cooled with the incoming gases. Too violent reaction in the upper zones of the catalyst is effectively prevented by the fact that the gases contacting with the upper layers of the catalyst are partly cooled by the gases in the tubes 9 and may be mixed with a suitable amount of cold gases through the pipes 14.

It will be seen that the converter heats up in a steady regular manner the incoming cold gases and at the same time the catalyst itself is cooled. All of the heat of the catalyst or substantially all is thus utilized for heating the incoming gases and the manner of flow permits a very even cooling action while at the same time, the provision of the pipes 14 makes it possible to control sudden increases in temperature in the upper catalyst zones by a sudden and large increase in the inflow of cold gases. Thus, an effective cooling takes place for ordinary use and in emergencies sudden rises in temperature can be combatted almost instantly by the introduction of large amounts of cold gases through the pipes 14. Where the reaction is not strongly exothermic and sudden overheating of the catalyst is not to be feared, the auxiliary cool gas pipes 14 may be dispensed with.

The heat evolved throughout the catalyst is, of course, by no means uniform since by far the greatest percentage of reaction and correspondingly of heat evolution takes place in the first catalyst layers and a rather steep temperature gradient will, therefore, exist in the catalytic layers from the top to the bottom. This temperature gradient is effectively utilized by causing the cold gases emerging from the bottom of the tubes 9 to come into heat exchanging relation first with a portion of the catalyst which is at a relatively low temperature and then as they are heated up and as they rise in the tubes 11, the gases come into contact with progressively hot and hotter catalyst so that at all times, the gases are subjected to a temperature differential sufficient to cause a large and steady flow of heat from the catalyst to the gases. At the same time, the excessive temperatures which might otherwise be produced in the upper catalyst layers are to some extent moderated by the fact that the rising gases not only absorb heat from the catalyst, but also give off a certain increasing amount of heat to the incoming cold gases in the tubes 9.

Not only is the arrangement of gas flow with respect to the catalyst designed to absorb a maximum of heat, but due to the fact that the gases are passed through telescoped tubes with a correspondingly small gas passage cross-section, the flow is very rapid and the heat transfer is exceedingly efficient. In the arrangement shown in Fig. 1, in which the cooling tubes extend only part way down through the catalyst layer and are placed relatively close to each other, as is shown in Fig. 2, the reaction gases pass through the upper layers of the catalysts between the tubes at high speed and thus local overheating is to a large extent avoided. At the same time, the partly spent gases which pass through the lower catalyst zone possess a much slower speed on account of the widened passage and are, therefore, kept in contact with the catalyst for a sufficient period of time to effect a very complete reaction. In this way, by a proper proportioning and arrangement of cooling tubes, the gas speeds can be very accurately adjusted to the demands of any particular reaction and the catalyst can be loaded to a maximum in a reliable and effective manner. This is of great importance in reactions such as the catalytic oxidation of sulfur dioxide where in many cases the catalyst is very expensive and the commercial efficiency of the process depends in a very large measure on the permissible loading of the catalyst.

The combination of an even, efficient cooling by means of the tubes together with an effective emergency cooling through the introduction of gases from the tube 15 lends to the apparatus of the present invention a flexibility in use which is very desirable and this flexibility is achieved without any loss in efficiency of the converter itself. By utilizing the heat of reaction to preheat the incoming gases, great savings in fuel can be effected and in many cases little or no additional heating will be necessary or an additional heating by means of the exhaust gases may be used. This modification will be described in detail in connection with Figs. 6 to 8.

Fig. 5 illustrates a modification in which the tubes 11 extend substantially throughout the catalyst layer and accordingly the whole of the catalyst is cooled. This construction is desirable in certain reactions where it is necessary to maintain a relatively low temperature throughout the whole of the catalyst and where it is undesirable to slow up the gas passage through the catalyst at any point in order to prevent side reactions or other deleterious effects. The operation of the converter in Fig. 5 is, of course, identical with that described in Fig. 1.

Fig. 6 shows a means of using the heat of the exhaust gases by extending both tubes 9 and 11 beyond the lower perforated plate 13 into the exhaust chamber of the converter. Baffles 33 may be provided in order to bring the exhaust gases into more intimate heat exchanging contact with the tubes 11.

The converter shown in Fig. 6 is of advantage where it is desired to maintain an even temperature gradient throughout the whole of the catalyst and where it is necessary to preheat the incoming gases to a relatively high temperature. This type of converter can be very effectively used in the oxidation of sulfur dioxide where it is desirable to preheat the reacting gases to a relatively high temperature and where in most cases the heat which can be absorbed from the catalyst itself would be insufficient to effect a sufficient rise in temperature. The converter is also very advantageous for use in connection with reactions in which the final products are unstable at high temperatures and where it is desirable to rapidly cool the exhaust gases.

Fig. 7 illustrates a converter of the type shown in Fig. 1 which is connected with an external heat exchanger for heating the incoming gases by means of the exhaust gases. The external heat exchanger may be of any suitable type such as a tubular heat exchanger shown in the drawings or any other common design. A by-pass pipe 34 controlled by valve 35 may be used in order to regulate the amount of exhaust gases which pass through the heat exchanger and correspondingly to regulate the amount of heating which takes place therein. In a similar manner, part or all of the incoming gases can be circulated through the heat exchanger by a suitable adjustment of the valves 36 and 37 in order to control the temperature of the incoming gases.

Fig. 8 illustrates a converter operating similarly to that of Fig. 7, but containing an internal heat exchanger consisting of tubes 38, baffles 33 and an intake pipe 39 provided with perforations 40. The exhaust gases pass through the tubes 38, whereas the incoming gases flow from pipe 5 around the heating tubes and baffles 33 and through the perforations 40 and intake pipe 39 into the upper chamber of the converter. By suitable regulation, as in Fig. 7, the relative amount of the reaction gases passing through the heat exchanger can be varied to suit the conditions of any particular reaction. Obviously, of course, both an internal and an external heat exchanger can be used and other combinations of this principle will be apparent to those skilled in the art and are included within the invention.

Fig. 9 illustrates a different type of converter in which two separate cooling gases are used instead of one. The second cooling gas enters the upper converter chamber 22 through the pipe 23 and is distributed by means of the baffles 32 to the tubes 20 which are concentric with the tubes 9. The first gas is introduced into the tubes 9 through the pipe 5 and upper chamber 3. The two gases mix at the bottom of tubes 9 and 20 and the mixed gases ascend through the tubes 11, the cooling effects on the catalysts being, of course, similar to those described in connection with Fig. 1.

Fig. 9 also illustrates the use of two separate catalyst layers 19 and 29 separated by the perforated plate or screen 28. The catalyst layers may consist of different catalysts for effecting the same reaction or they may consist of different catalysts for effecting different reactions. Thus, for example, if a catalytic reaction proceeds in two stages, the first being strongly exothermic and the second being weakly exothermic or even endothermic, a converter such as that illustrated in Fig. 9 can be very effectively used, the exothermic reaction being controlled by the cooling in the tubes and the endothermic or the weakly exothermic reaction utilizing the heat which has been imparted to the gases by their passage through the catalyst layer. Obviously, of course, the arrangement of layers can be reversed and more than two layers can be used. The use of a plurality of layers is also not limited to the particular cooling tube construction shown in Fig. 9 and can be applied to the cooling construction shown in the other figures. An attempt has been made to illustrate as many conditions as possible in a minimum number of figures and the association of one feature with other features in the same figure should not be taken as a limitation, since, as in the case of Fig. 9, the use of a plurality of catalyst layers may be applied equally to the construction shown in the other figures. However, in certain figures, certain combinations of features may be advantageous for particular reactions and while in its broader aspects, the invention is not limited to combinations in any single figure in more specific aspects, these combinations are included within the purview of the invention.

Fig. 10 illustrates a converter provided with means for introducing two gases, one from the space 3 into the tubes 9 has been described in previous figures, and another portion of gas through the pipe 25 which gas is distributed by the baffles 26 and passes down through the pipes 27 directly into the catalyst space so that a stream of cold gas strikes the upper portion of the catalyst. This type of converter is very useful in reactions where a great proportion of the heat is developed in the first few inches of catalyst and overheating is prevented by the streams of cold gas striking this hot portion of the catalyst. A very even and efficient control of temperature can be brought about by means of this type of converter and where the gases entering the space 3 are preheated they serve to slightly heat the cold gases passing through the pipes 27 and are at the same time somewhat cooled down. The hot gases emerging from the pipes 11 also mix immediately with the cold gases from the pipes 27 and a uniform temperature control can be easily effected.

A similar design of converter is shown in Fig. 11 but the mixing of gases coming from the pipes 27 with the gases emerging from the pipes 11 is effected by causing the gases to emerge from the pipes 27 in a more or less horizontal direction. This is brought about by removable bottoms 38 in the pipes 27 which force the gases to pass out through the perforations 39 in the tubes, thus effecting a more uniform mixture of the two gases and preventing jets of cold gas from striking the catalyst surface, as may readily occur in the design shown in Fig. 10 when the gas velocities through the pipes 27 are high. A detailed view of the bottoms of the pipes 27 is shown in Fig. 15.

The converter shown in Fig. 11 also illustrates the use of two different layers of catalyst, one layer being cooled by the tubes 11 and the other being uncooled. In both Figures 10 and 11, the catalyst can be charged into the converter not only through the charging opening 16 but also through the pipes 27 after removing the bottoms 38 in the case of the converter shown in Fig. 11. It is advantageous for some purposes to charge through these tubes in order to effect a more uniform distribution of catalyst.

Figures 12 and 13 show modified constructions for introducing a plurality of gases. In Fig. 12, the pipes 27 are arranged in a somewhat similar manner to that shown in Fig. 11 and the tube 11 is closed at the top carrying perforations just below the level of the catalyst so that the heated gases pass out into the catalyst without mixing with the cold gases coming through pipes 27. The inner tube 9 is also shown perforated but can, of course, be solid with an open bottom.

In Fig. 13 the cold gases from the space 3 pass through the tubes 9 and 11, as in the foregoing figures, but instead of emerging directly into the space above the catalyst they pass out into a space 40 into which cold gases are fed through the pipes 14 and thorough mixture is effected by means of the baffle plates 31. The mixed gases then pass down through openings in the plate 42 and strike the catalyst 19. The tube 11 can be supported by the lugs 43 bearing on the plate 42.

Fig. 14 illustrates a converter of the general type described above but which is inverted, the gases passing first up through the tubes 9 and then down through tubes 11 and finally up through the catalyst. This construction is advantageous for certain installations and operates in a manner very similar to the converters shown in the other figures. Additional cold gas, of course, can be introduced through the pipes 14 from the common manifold 15.

Many other modifications may be made and the figures are merely illustrations of a few of the modifications which embody the principle of the invention. The invention is not limited to the precise construction shown in the figures and includes the modifications which may be necessary or desirable to meet the conditions of particular catalytic installations.

It will be evident from a consideration of the drawings that the converters of the present invention permit a very flexible and even control of temperature which can be readily adapted to particular shapes of converters and types of catalysts which may be desirable in particular instances. Control by introduction of one or more separate streams of cold gases in a suitable manner to mix with partly heated gases combined with numerous possibilities of variation in the length and cross section of the cooling tubes adapts the present invention to a wide field of catalytic reactions and particularly such reactions which are difficult to control or are strongly exothermic, or both. The simple and effective temperature control both of the incoming gases and of the catalytic mass itself can be achieved without substantial loss of heat and in many cases the effective utilization of the heat generated in the reaction may make it unnecessary to apply any outside heat whatever. Thus, not only is the present invention an effective means for the control of temperature in catalytic reactions but at the same time, in many cases, it effects this desirable result with a great economy of fuel over the converters which have hitherto been used. Moreover, the converters of the present invention do not necessitate particularly complicated cooling mechanism, such as, for example, liquid baths, boiling at certain definite temperatures and the like, which have been necessary in the past and which have introduced considerable complications into the converter structure and have also increased the expense. It should be understood, however, that the present invention is not limited to converters or to catalytic processes in which the gas cooling feature of the present invention constitutes the only cooling means. On the contrary, where desirable the features of the present invention may be combined with liquid cooling systems in the form of cooling coils, jackets, and the like and it should be understood that the principles of the present invention are claimed, not only where the gas cooling is the only cooling means, but also where it is combined with other cooling means which have been described in the prior art or with modifications or improvements on them.

In most of the figures, the tubes 9 and 11 have been shown empty and for many purposes this construction is satisfactory and is, of course, both simple and economical. In some cases, however, it is desirable to increase the heat transfer efficiency of the cooling tubes and in such cases either the tubes 11 or the tubes 9 or both may be filled with heat transfer materials of high heat conductivity such as metal turnings, spirals and the like, in order to decrease the gas passage cross section, increase the gas speed and bring the gas into more intimate heat exchanging contact with the heat exchanging surfaces of the tubes. Obviously, of course, this provision for increased heat transfer may be employed in some of the tubes, whereas other tubes are left empty. It is thus possible to equalize the temperature of the catalyst throughout the whole of the converter cross section. For example, in many cases, the walls of the converter tend to cool the catalyst which is near the periphery, whereas the catalyst in the center tends to retain its heat. By a suitable adjustment of cooling capacity of the gas tubes either by changes in the placement or size of the tubes or by the addition of heat exchanging elements, the central portions of the catalyst may be cooled to the same temperature as the peripheral portions. Similar modifications of cooling capacity can be effected by varying the lengths of the tubes 9, producing in certain cases, relatively long tube portions which have but a slow gas circulation as illustrated in Fig. 5. The lengths of the tubes 9 can, of course, be increased progressively from the periphery toward the center of the converter and the variation in cooling efficiency through variations in the length of the tubes 9 or through the provision of suitable perforations in the sides of these tubes can be adapted in many different ways to effect an accurate control of cooling capacity which may be desirable in certain constructions.

The present invention possesses a further important technical advantage in that it is not necessary to mount the cooling tubes so that they are perfectly gas-tight, nor is it necessary to maintain them in a state of gas-tightness, as small leaks are, for the most part, harmless, since the flow of gases is such that a leak would merely cause a small amount of cold gas to enter into the catalyst space and unless the leaks were very large, the process would not be affected at all. This advantage is of considerable importance in converters which are used for a long time and also in processes such as the catalytic oxidation of sulfur dioxide, where the product is cheap and the converters must be run with a minimum of shutdowns in order to make the process economically profitable. At the same time, many of the catalytic processes which must be carried on continuously without shut-downs for long periods of time also evolve considerable heat, so that the problem of gas-tight fittings is frequently quite a serious one, and the present invention which saves cost in rendering it unnecessary to work with excessively close fits and which is not affected by small leaks, represents a distinct forward step and one which is of considerable commercial importance. Of course, where external heat exchangers are combined with converters embodying the features of the present invention, the heat exchangers themselves must be kept gas-tight.

Another advantage of the present invention in most of its modifications lies in the fact that the tubes 11 are surrounded with catalysts throughout almost their whole length and are also subjected to hot gases. There is thus but little tendency to form corrosive liquids, such as, for example, acid mist in the catalytic oxidation of sulfur dioxide and accordingly the tubes do not tend to become corroded. This is a further advantage of the present invention and aids greatly in the prevention of shut-downs and in the avoidance of expensive repairs.

The cooling system of the present invention is very flexible and many modifications can be used. A single catalyst layer can be effectively cooled or separate catalyst layers can be used, some of which are cooled and some of which are not cooled. The use of a plurality of layers is clearly shown in Figs. 9 and 11. These catalyst layers may contact with each other or they may be separated by a perforated plate as shown in Fig. 9 or by a perforated plate and gas space as is shown in Fig. 11. This latter construction is advantageous in many cases, as the partly reacted gases are permitted to mix before striking a second catalyst layer and a more efficient equalization of gas pressure is thereby possible.

The proportions of the components of a single contact layer or of different layers, of course, can be varied within wide limits and depend, of course, upon the nature of the reaction to be carried out in the converter. The proportion of reaction taking place in the cooled part of the catalyst and that in the uncooled may also be varied and depends on the conditions of any particular reaction. Merely as an example and without in any sense limiting the invention to this proportion we have found that in the oxidation of sulfur dioxide it is advantageous to cause from 75% to 80% of the conversion to take place in the portion of the catalyst which surrounds the cooling tubes.

The present invention with its great flexibility and possibilities of accurate temperature control permits a much higher loading of the catalyst than is possible in the usual converters, as it is safe to carry the loading and consequently the heating of the catalyst much closer to the upper limit than where a less reliable and less flexible cooling system is used. The heat economy, of course, depends on the size of the unit and in many large units operating with strongly exothermic reactions no outside heat is needed. The invention is, however, in no sense limited to installations which are of sufficient size and which are used in sufficiently exothermic reactions to make outside heating unnecessary and on the contrary, the advantages of the present invention are equally applicable to smaller converters and reactions where the heat evolved is not great or even where heat is absorbed in certain reaction stages.

The present invention also is advantageous in that it can be readily adapted to many standard converters without extensive reconstruction, an advantage which is of great commercial importance in the case of many converters which are of great size and which represent a very large investment. For example, the well known Grillo converter used in the oxidation of sulfur dioxide can be provided with cooling tubes of the type of the present invention with a minimum of change and when so reconstructed we have found that the converters give considerably better yields of sulfur trioxide. Other layer type converters may also be rebuilt according to the present invention with comparatively little change. Tube converters are less suitable but the invention is not intended to exclude tube converters, although it is more peculiarly adapted for layer converters.

The invention also possesses the advantage that it can be applied to reactions which are carried out under various pressures above or below that of the atmosphere. This is an important consideration, since many reactions are carried on at very high pressures and frequently present a serious problem in cooling system design.

In the claims, the expression "in indirect heat exchanging relation" is used to define the relation of the gases in the open end tubes to the catalyst. These gases are not in direct heat exchanging relation to the catalyst because the heat from the catalyst cannot flow directly to them, as, for instance, through a metal wall, but is obliged to traverse at least one space filled with flowing gases so that heat from one portion of the catalyst will normally not reach the gases in the open end tubes at the same level, but will be carried up or down by the gases flowing between it and the open end tubes. There is a transfer of heat from the catalyst to the gases passing through the open end tubes, but this transfer is indirect and not in a straight line. When, therefore, the expression "in indirect heat exchanging relation" is used in the claims, it is intended to be used in the sense defined above. This expression, however, is not intended to cover heat exchangers in which incoming gases contact with walls heated by gases which have already passed through the catalyst. The expression "in direct heat exchanging relation" is used to cover cases where the gases are separated from the catalyst by a solid wall or by any other medium which is not in motion and which will, therefore, transfer heat from the catalyst more or less directly to the gases.

Having thus described our invention, what is claimed as new is—

1. Catalytic apparatus comprising in combination a catalytic chamber, catalyst therein, a gas permeable bottom supporting said catalyst, a gas impermeable partition above the catalyst layer, upright tubes having closed bottoms, at least a portion of the tube being embedded in the catalyst and the open end being below the gas impermeable upper partition, open ended tubes passing downwardly through the upper partition into the closed end tubes and extending for a substantial distance therein below the level of the catalyst layer, and means for causing reaction gases to pass downwardly through the open ended tubes upwardly through the closed ended tubes and then downwardly through the catalyst layer.

2. An apparatus according to claim 1 provided with means for the direct introduction of reaction gases into the catalytic chamber above the catalyst layer and below the upper partition.

3. An apparatus according to claim 1 in which the open ended tubes extend substantially to the bottom of the closed end tubes.

4. An apparatus according to claim 1 in which the open end tubes extend substantially to the bottom of the closed end tubes and the latter extend only part way through the catalyst layer.

5. A catalytic apparatus comprising a catalytic chamber, a catalyst layer therein, gas permeable means for supporting said layer, a plurality of gas impervious partitions above said layer and dividing the upper portion of the chamber into a plurality of separate chambers, closed end tubes embedded in the catalyst layer and having open ends extending above the layer but terminating below the lowest gas impervious partition, a plurality of open end tubes extending from and through the respective gas impervious partitions into the closed end tubes for a considerable distance below the level of the catalyst layer, and means for introducing reaction gases into the chambers formed by the gas impervious partitions.

6. Apparatus according to claim 1 provided with means for causing the gases after passing through the catalyst layer to pass through a heat exchanger, and means for passing reaction gases through the heat exchanger in heat exchanging relation with the exhaust gases, and means for introducing the gases so preheated into the open end tubes.

7. Catalytic apparatus comprising in combination a catalyst chamber, catalyst layer therein, gas pervious means for supporting the catalyst layer, at least one gas impervious partition above the catalyst layer and dividing the upper portion of the catalytic chamber into compartments, tubes embedded in the catalyst layer having closed lower ends, tubes extending through and downwardly from the lowest gas impermeable partition into the closed end tubes, said closed end tubes being provided with gas exit means below the catalyst level and said tubes extending downwardly from the partition being provided with gas outlets below the catalyst level.

8. Catalytic apparatus comprising in combination a catalyst chamber, a catalyst layer therein, gas pervious supporting means for said catalyst layer, a gas impervious partition provided with holes and being placed above the catalyst layer, baffles above said holes, a second gas impervious partition above the perforated partition, closed end tubes passing downwardly through the first partition and extending into the catalyst layer, their open ends terminating below the second partition, open end tubes passing downwardly through the second partition into the closed end tubes and extending therein for a considerable distance below the upper level of the catalyst layer, and means for introducing reaction gases into the compartments both above and below the second partition.

ALPHONS O. JAEGER.
JOHANN A. BERTSCH.